United States Patent [19]

Saunders

[11] Patent Number: 4,921,259
[45] Date of Patent: May 1, 1990

[54] PACKOFF SEAL WITH DUAL MEMBER ENGAGING MEANS

[75] Inventor: Brian Saunders, Chipping Sodbury, England

[73] Assignee: Cameron Iron Works USA, Inc., Houston, Tex.

[21] Appl. No.: 312,478

[22] Filed: Feb. 21, 1989

[30] Foreign Application Priority Data

Jan. 13, 1989 [EP] European Pat. Off. ........ 89300310.3

[51] Int. Cl.$^5$ .............................................. F16J 15/18
[52] U.S. Cl. ................................. 277/112; 277/116.4; 285/3
[58] Field of Search .................. 277/112, 116.2, 116.4; 285/3, 4, 146, 147, 338; 166/208, 115, 182, 85

[56] References Cited

U.S. PATENT DOCUMENTS

| | | | |
|---|---|---|---|
| 2,921,633 | 1/1960 | Baker | 277/116.2 |
| 2,988,148 | 6/1961 | Conrad et al. | 277/116.4 |
| 3,004,776 | 10/1961 | Sebardt | 285/3 |
| 3,972,546 | 8/1976 | Patch | 285/3 |
| 4,008,898 | 2/1977 | Weldon | 277/116.2 |
| 4,138,144 | 2/1979 | Pierce, Jr. | 285/18 |
| 4,407,530 | 10/1983 | Fowler | 285/140 |
| 4,408,783 | 10/1983 | Gruller | 285/3 |
| 4,416,472 | 11/1983 | Fowler | 285/3 |
| 4,500,117 | 2/1985 | Ayers et al. | 285/3 |
| 4,754,812 | 7/1988 | Gentry | 166/182 |
| 4,836,579 | 6/1989 | Wester et al. | 285/3 |

Primary Examiner—Allan N. Shoap
Assistant Examiner—Scott Cummings

[57] ABSTRACT

An improved annular seal including a resilient seal ring, a first follower, a second follower being threadedly connected to the first follower, threads on the first follower for setting movement of the followers, a shear pin for releasably securing the second follower to the first follower, the first follower having a lower rim for engaging the resilient seal ring, the second follower having a lower extension for exerting a loading force on the resilient seal ring, the area of engagement of the first follower with the seal ring being substantially larger than the area of the second seal ring exerting the seal ring loading force. In one form the second follower includes a lower rim extending around the exterior of the first follower into engagement with the seal ring. In a modified form the first follower includes a plurality of openings through its lower rim and the second follower includes a plurality of pins extending through the openings to exert a force on the seal ring.

10 Claims, 2 Drawing Sheets

४,९२१,२५९

PACKOFF SEAL WITH DUAL MEMBER ENGAGING MEANS

BACKGROUND

The present invention relates to an improved elastomer seal in which the elastomer is energized in two stages. The improved seal structure of the present invention has particular applications to annular seals between members such as hanger packoff seals.

U.S. Pat. No. 4,008,898 discloses an annular elastomer seal between facing cylindrical surfaces in which the seal follower or actuator is shear held inactive by a shear pin and the seal support ring is also shear pinned so that the initial seal loading results from the movement of the seal follower and then when the seal exerts sufficient load on the seal support ring it moves downward in the annulus to let the seal move to its desired sealing position.

U.S. Pat. No. 4,138,144 discloses another wellhead annular sealing assembly in which shear pins are used to control the time of movement of the first member 40 and the locking sleeve 50.

U.S. Pat. Nos. 4,407,530, 4,408,783 and 4,416,472 are all directed to an annular packoff for a hanger in which the seals are controlled to be set singly and in series.

U.S. Pat. No. 3,004,776 discloses a sealing nut for a pipe coupling having a press ring 15 carried by the nut by a thin section which is intended to be sheared so that the press ring and the sleeve both exert sealing force on the resilient sealing ring. Press ring and sleeve coact to contain sealing ring within nut and around the exterior of pipe-end threads 19.

SUMMARY

The improved elastomer seal is suitable for sealing a wellhead annulus between the interior of the wellhead housing and the exterior of a hanger positioned therein and having an external seal supporting shoulder, a resilient seal positioned between the hanger and the housing on said supporting shoulder, a follower structure having a first follower which engages a substantial area of said seal to urge it toward said supporting shoulder and a second follower which engages a substantially smaller area of said seal to urge it toward said supporting shoulder, means releasably securing said second follower to said first follower and being preselected to release the second follower upon the reaching of a preselected force against the seal so that the second follower may be urged against said seal independent of said first follower and by virtue of its reduced area of contact can create substantial sealing loading in said seal.

An object of the present invention is to provide an improved annular resilient seal in which the seal follower can provide substantial seal loadings.

Another object is to provide an improved annular resilient seal which can be set with substantial seal loadings without subjecting the loading follower to high loading forces.

A further object is to provide a two stage loading of a resilient annular seal in which high seal loadings are provided with low force loadings.

BRIEF DESCRIPTION OF THE DRAWINGS

These and other objects and advantages of the present invention are hereinafter set forth and explained with respect to the drawings wherein.

DESCRIPTION OF THE PREFERRED EMBODIMENTS

Figure 1:
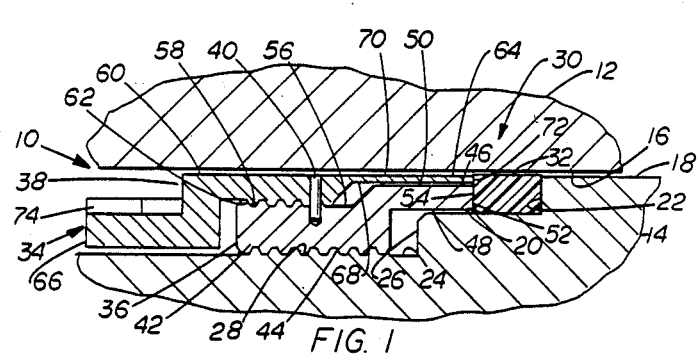
FIG. 1 is a partial sectional view of the improved annular resilient seal of the present invention installed between the exterior of a well hanger and the interior of a well housing.
Figure 2:
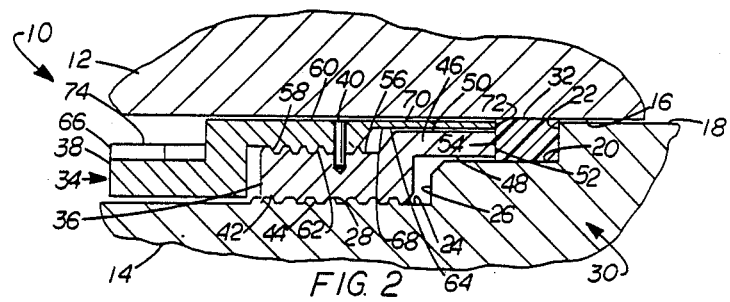
FIG. 2 is another partial sectional view of the seal shown in FIG. 1 after it is partially energized to its set position by the follower assembly.

Improved seal structure 10 of the present invention is shown in FIG. 1 as being positioned within wellhead housing 12 and in surrounding relationship to hanger 14. Wellhead housing 10 includes inner cylindrical sealing surface 16 surrounding hanger 14. Hanger includes lower outer surface 18 which is slightly smaller than housing sealing surface 16, intermediate sealing surface 20 which is smaller in diameter than sealing surface 18 with shoulder 22 between surfaces 18 and 20 and upper surface 24 which is smaller than surface 20 with shoulder 26 between surfaces 20 and 24 and includes external threads 28 thereon.

Seal assembly 30 includes annular resilient seal or ring 32, and follower assembly 34. Follower assembly 34 includes first follower 36, second follower 38 and means 40 releasably securing second follower 38 to first follower 36. First follower 36 includes body 42 having internal threads 44 for engaging with threads 28 on the exterior of hanger 14 and setting rim 46 extending downwardly therefrom and having an inner diameter surface 48 which is slightly larger than the diameter of intermediate sealing surface 20, an outer diameter surface 50 which is smaller than the inner diameter of housing sealing surface 16 and lower seal engaging surface 52 which is in engagement with a substantial portion of upper surface 54 of resilient seal 32. Body 42 includes outer reduced diameter surface 56 with threads 58 thereon. Second follower 38 includes central body 60 having internal threads 62 which engage external threads 58 on body 42, lower rim 64 and upper setting rim 66. Lower rim 64 has inner surface 68 which is slightly larger than outer surface 50 of first follower rim 48 and outer surface 70 which is slightly smaller than inner sealing surface 16 of housing 12 so that lower rim 64 can readily move between the exterior of first follower 36 and the interior of housing and lower end 72 which is in engagement with upper seal surface 54. As shown the area of engagement of upper seal surface 54 by lower end 72 of second follower 38 is substantially less than the area of engagement of upper seal surface 54 by lower end surface 52 of first follower 36. Suitable connecting means 74, such as a J slot, is provided on the upper exterior of second follower 38 for the running and setting of seal assembly 30. Releasably securing means 40 is any suitable means such as the shear pin illustrated.

Figure 3:
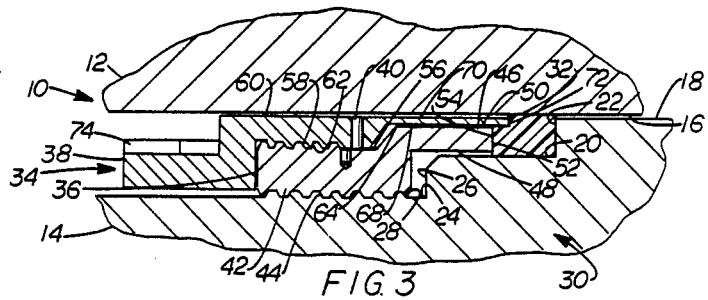
FIG. 3 is another partial sectional view of the seal shown in FIGS. 1 and 2 illustrating the completely energized seal by the second portion of the follower assembly.

In operation seal assembly 34 is lowered into the position shown in FIG. 1 with first follower threaded onto external hanger threads 28 and with resilient seal 32 positioned between sealing surface 16 of housing 12 and sealing surface 20 of hanger 14. The lower ends 52 and 72 of first and second followers 36 and 38 are in engagement with upper surface 54 of resilient seal 32. Rotation of second follower 38 causes first follower 36 to be rotated on threads 28 to move follower assembly 34 downwardly against the upper surface 54 of seal 32 causing it to be compressed axially and to expand radially into engagement with surfaces 16 and 48 of housing 12 and hanger 14, respectively. When the load on seal 32 reaches a preselected amount releasable securing means 40 releases (shear pin shears) so that further rotation of second follower 38 causes it to move downward on external threads 58 on first follower 36. Because of the smaller area of second follower lower rim 64 in engagement with resilient seal 32, the additional movement of second follower will have the effect of increasing the loading on resilient seal 32 without requiring a commensurate increase in the torque loading of follower assembly 34. The mechanical advantage achieved by the lower area of contact of the second follower provides substantial increases in sealing forces over those which could be achieved by the same torque loading of first follower 36. The continued rotation of second follower 38 moves it downward relative to first follower 36 to the position illustrated in FIG. 3. Resilient seal 32 is sufficiently confined that it does not extrude from its sealing position.

FIGS. 4 through 7 illustrate a modified form of seal assembly in which the elements of the assembly which are unchanged are given the same number designation with the prefix "1" and the changed components are provided with new number designations. Improved seal assembly 130 is provided to seal between inner sealing surface 116 of housing 112 and external intermediate sealing surface 120 of hanger 114. Seal assembly 130 includes resilient seal ring 132 and follower assembly 134. Follower assembly 134 includes first follower 136 and second follower 138 with releasable securing means 140, such as a shear pin, for securing followers 136 and 138 into a releasable assembly. First follower 136 is threaded onto external hanger threads 128 and includes lower rim 175 which engages substantially all of the upper surface 154 of resilient seal ring 132. Lower rim 175 of first follower 136 includes a plurality of axially extending openings 176 extending therethrough for receiving lower pin ends 178 of second follower 138 which are in the shape of cylindrical pins. Resilient plugs 180 are positioned within openings 176 in lower rim 175 so that pin ends 178 of second follower engage plugs 180 and the force developed by the movement of second follower 138 after the release of releasable securing means 140 is directed through plugs 180 into resilient seal 132. With the area of pin ends 178 and plugs 180 being relatively small compared to the area of contact with seal ring 132 by the end of lower rim 175, a very considerable increase in sealing pressure is provided by this mechanical advantage without substantial increase in the setting torque.

Figure 4:
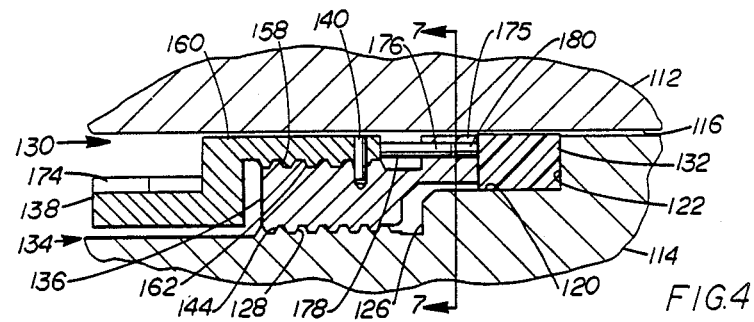
FIG. 4 is another partial sectional view of another form of the improved seal of the present invention prior to its energization.
Figure 5:
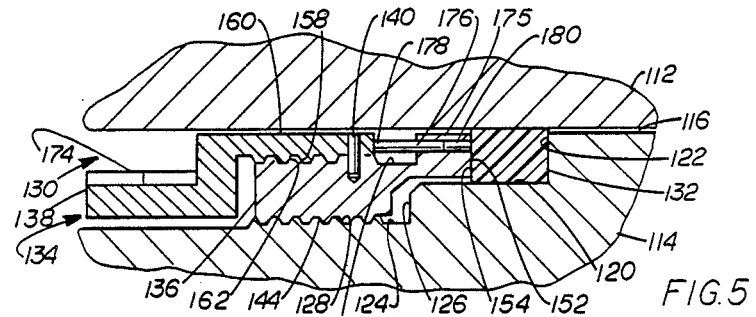
FIG. 5 is another partial sectional view of the seal of FIG. 4 in its partially set position.
Figure 6:
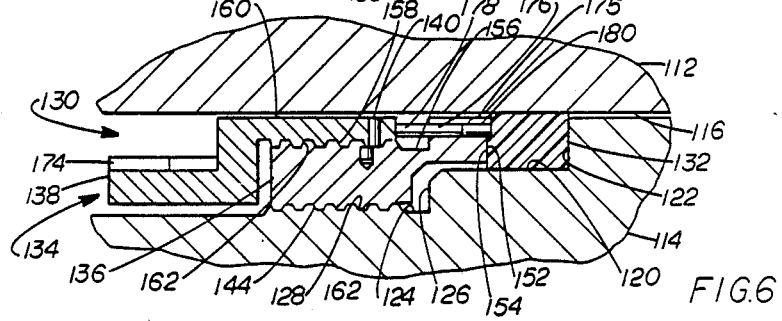
FIG. 6 is another partial sectional view of the seal of FIGS. 4 and 5 in its completely energized position by the second portion of the follower assembly.
Figure 7:
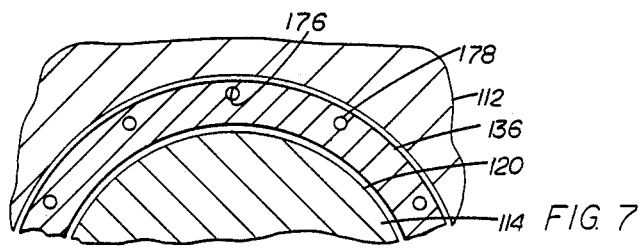
FIG. 7 is a partial sectional view taken along line 7—7 in FIG. 4 to illustrate the positioning of the seal engaging extension means of the second follower.

Seal assembly 130 is illustrated in FIG. 4 as being installed with seal ring 132 in its desired position without any sealing pressure being exerted thereon. Initial sealing is illustrated in FIG. 5 which is the result of the rotation of follower assembly 134 up to the preselected load at which releasable securing means 140 releases. Thereafter, further rotation of follower assembly 134 causes the axial movement of second follower 138 on first follower 136 to the position illustrated in FIG. 6.

In both forms of the present invention, the follower assembly is provided which will provide initial loading of the resilient seal until the securing means releases and thereafter further rotation without substantial increase in the torque of rotation provides substantial increase in the sealing pressure exerted on the resilient seal. This sealing assembly which has been illustrated and described as being applicable to the annular seal between a well housing and hanger has application to many different annular seals in which it would be advantageous to provide a desired level of seal pressure without commensurate torque loading of the follower.

What is claimed is:

1. A sealing structure comprising
    an annular resilient seal positioned in an annulus between inner and outer cylindrical surfaces to be sealed,
    means supporting said resilient seal in said annulus to be sealed,
    a seal follower structure including
    a first follower being in planar engagement with said resilient seal and having means for moving against said seal to urge it into a tightly sealed position,
    a second follower having an extension thereof in planar engagement with said resilient seal and means for moving said second follower against said seal by movement relative to said first follower, and
    means releasably securing said second follower to said first follower,
    the area of engagement of said second follower with said seal being substantially less than the area of engagement of said first follower with said seal,
    said releasable securing means being releasable by the seal setting force reaching a preselected maximum force so that said second follower moves further against said seal and said first follower is retained in the position achieved at the point of release of said securing means.

2. A sealing structure according to claim 1 wherein said second follower includes a thin lower rim extending around the exterior of said first follower into engagement with said seal.

3. A sealing structure according to claim 1 wherein said second follower includes a plurality of pins extending axially through openings in said first follower for exerting a sealing force.

4. A sealing structure according to claim 3 including
    a resilient plug in each of the openings in said first follower,
    said pins extending into said first follower openings and engaging said plugs,
    said plugs engaging said resilient seal and transmitting the force exerted by said pins of said second follower to said resilient seal.

5. A sealing structure comprising
    a well housing having an internal cylindrical sealing surface,
    a hanger positioned within said well housing and having an upwardly facing shoulder and an outer sealing surface above said shoulder and facing said housing sealing surface, a seal assembly having a resilient seal, a first follower, a second follower and releasable means securing said second follower to said first follower, said first follower having a lower seal engaging rim, said second follower having a lower seal engaging portion, means for moving said followers axially of said hanger against said resilient seal, and means for moving said second follower axially of said first follower after release of said securing means responsive to a preselected seal loading exerted by said first followers, the area of seal contact of said first follower being substantially greater than the area of seal contact of said second follower.

6. A seal structure according to claim 5 wherein said second follower includes a lower rim surrounding the exterior of said first follower and adapted to engage said resilient seal.

7. A seal structure according to claim 5 wherein said first follower includes a plurality of axially extending openings through its lower rim, said second follower includes a plurality of axially extending pins extending through said openings in said first follower to exert a loading force on said resilient seal independent of the loading of said resilient seal by said first follower.

8. A seal structure according to claim 5 wherein said means for moving said first follower includes threads on the exterior of said hanger above its sealing surface, and threads on the interior of said first follower engaging within said hanger threads whereby rotation of said first follower threads it against said resilient seal to provide an axial loading thereof.

9. A seal structure according to claim 8 wherein said means for moving said second follower includes second threads on the exterior of said first follower, and internal threads on said second follower in engagement with said second threads on said first follower, rotation of said second follower with respect to said first follower moving said second follower axially on the second threads of said first follower.

10. A seal structure according to claim 5 wherein said releasable securing means includes a shear pin connecting between said first follower and said second follower for transmitting rotational movement therebetween until a preselected loading is reached and thereafter allowing independent rotation of said second follower.

* * * * *